July 15, 1930.  F. J. OVEN  1,770,548
GASKET
Filed Oct. 4, 1926
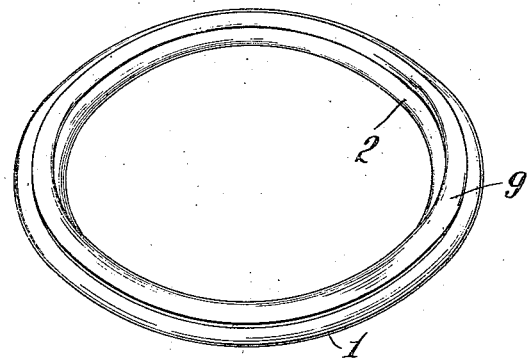
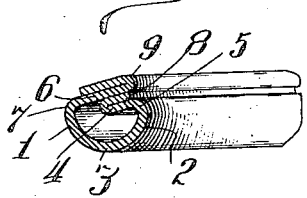
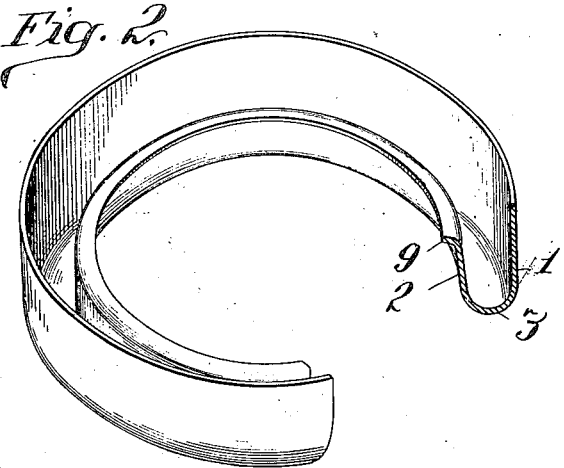
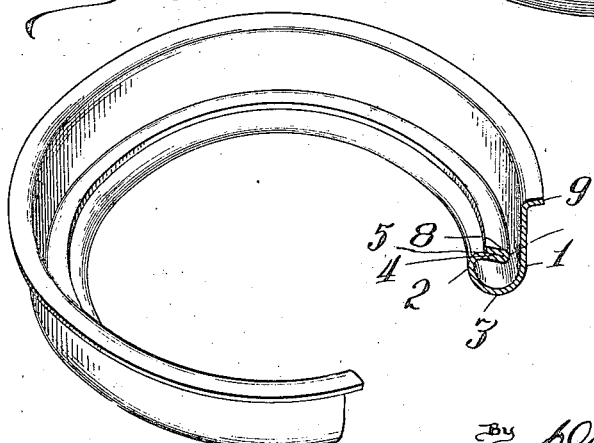
Inventor
Frank J. Oven
By Daniel Brennan.
Attorney Patented July 15, 1930

1,770,548

UNITED STATES PATENT OFFICE

FRANK J. OVEN, OF CHICAGO, ILLINOIS, ASSIGNOR TO VICTOR MFG. & GASKET CO., A CORPORATION OF ILLINOIS

GASKET

Application filed October 4, 1926. Serial No. 139,443.

This invention relates to improvements in gaskets.

It is an object of the invention to provide a metal shell of an annular gasket with an efficient seam or seal for joining the two longitudinal margins of the element of which the shell is formed in a secure non-releasable way.

Another object of the invention is to provide a shell for a tubular metal gasket in which the closing margins of the shell are suitably reinforced to increase the resistance of the tubular shell against compression.

It is also an object of the invention to provide a shell or gasket which when completed will be substantially smooth over its entire circumference and will not present any projecting metal parts or marginal portions which may readily be broken off or bent and which might thereby interfere with the use and storage of the gasket.

With these and numerous other objects in view the invention is described in the following specification in which reference is made to the drawing, and the novel features are pointed out in the appended claims.

In the drawings:

Fig. 1 is a perspective view of the completed shell or gasket;

Fig. 2 is a partial perspective view and also partly sectional view of the sheet metal member of which the gasket is to be formed;

Fig. 3 is a similar view showing the member in a more complete stage of manufacture, and Fig. 4 is a similar fragmentary view showing a detail of the completed shell.

The annular gasket is formed of a sheet metal member which through suitable operations, as by pressing, stamping or the like, is converted into the member showing a substantially trough-shaped cross-section illustrated in Fig. 1. Said cross-section comprises the two lateral walls 1 and 2 and a bottom 3 preferably merging into the lateral walls along a curve. The lateral walls 1 and 2 may originally rise to the same height from the bottom 3. The inner lateral wall 2 is slightly deflected inward, as indicated at 4, over its entire circumference to present a marginal inward directed flange which merges into the wall 2 along a curve 5 of relatively small radius.

A similar marginal flange 6 is also produced at the free edge of the outer lateral wall 1, this marginal flange 6 projecting in a direction opposite to the marginal flange 4 and also being joined to the lateral wall 1 by a curve 7 of relatively small radius.

For the purpose of converting the gasket member from a member of open trough shaped cross-section into a tubular member of closed cross-section, the two lateral walls 1, 2 prepared in this manner are then folded upon themselves. From Fig. 3 it will be seen that the inner wall 2 is deflected towards the outer wall 1 at a relatively short distance from the lowest portion or bottom 3 of the trough so as to present an outward directed flange 8 which, however, is spaced from the opposite or outer wall 1 of the shell member.

The production of this circumferential flange 8 will reduce the height of the gasket or shell measured in the direction of its axis, but it will provide one portion of a reinforced margin, which will greatly reinforce the structure against collapse under pressure. The insertion of one or more refractory elements as has been customary heretofore in gaskets of this type may then be dispensed with. The flange 8 produced in this way is reinforced by bending the first produced flange 4 inward again, folding the flange 4 directly upon the outward directed flange portion 8 of the lateral wall 2 to produce thereby adjacent the margin of this wall of the shell, a portion which consists of two plies or layers of the metal of which the shell is formed.

Similarly the opposite lateral wall 1 of the shell is deflected about a line, as shown at 9, Fig. 4, to extend in direction towards the first described lateral wall. For the purpose of reinforcing this flange portion 9 produced from the outer wall of the lateral shell, the flange 7 previously described is now folded over the flange portion 9, whereby this outer lateral wall is formed into a marginal portion.

The two marginal portions of the lateral walls 1, 2, each of which portions consists of two plies of the metal, as indicated at 7, 9 and 4, 8 respectively, are then brought into engagement with each other over their entire circumference as illustrated in Fig. 4, whereby an effective seal of the space confined by the lateral walls of the same is effected, and the conversion into a tubular member is completed. The flanged margins 4 and 6 are inclined to the horizontal. This arrangement is most advantageous, for a gasket with an upper wall inclined in this manner gives greater height for the same amount of material than a gasket having a horizontal wall. Since a gasket of greater height is provided it is manifest that greater compressibility and more adaptability for conformity to unevenness is provided. Further, by inclining this upper wall a neater fit onto a conical surface may be attained for manifestly greater area of contact can be thus secured.

It will be seen that in this manner the gasket or shell is strongly reinforced at the joining portion at which four plies of the material are in superposed relation to protect the gasket effectively against collapse under strong pressure. While the drawing shows the gasket in annular form, it is obvious that the new article may be produced from longitudinal extended strips of metal of suitable hardness, by first treating the longitudinal strip to assume the tubular cross-section, as described, and then rolling the strip to annular shape, or in some other approved way.

I claim:

1. A tubular gasket shell consisting of a single piece of material formed into a bottom portion extending along a curve and spaced side walls curving inwardly and each terminating in a marginal flange portion, the flange portion of one wall being bent under and engaging the flange portion of the other wall, thereby to form a reinforcing seam.

2. A gasket formed of sheet metal the marginal edges of the sheet being bent reversely to form flanges and the sheet being bent to hollow tubular form with the flanged margins overlapping.

3. A gasket formed of sheet metal having its marginal edges bent back and upon the body on the outer sides thereof and forming flanges, the body being bent to hollow tubular form with the flanged edges overlapping.

4. A tubular gasket formed of sheet metal having its marginal edges flanged and overlapping, the flanged margins being inclined to the horizontal plane of the gasket.

5. A tubular gasket formed of sheet metal having its marginal edges flanged and overlapping in parallel relation, the flanged margins being inclined to the horizontal plane of the gasket.

6. A tubular gasket formed of sheet metal, the marginal edges of the sheet being bent reversely to form overlapped flanges, the sheet being bent to form with the overlapped flanges a hollow channel of appreciable dimensions.

7. A gasket formed of sheet metal, the marginal edges of the sheet being bent reversely to form flanged margins to constitute one face of the gasket, the opposite face being curved, the gasket being practically hollow.

8. A gasket formed of sheet metal, the marginal edges of the sheet being bent reversely to form flanged margins to constitute one face of the gasket, said margins being arranged in overlapping relation and the intermediate portion of the sheet having a curvilinear shape whereby to form a substantially cylindrical reinforced gasket.

9. A gasket formed of sheet metal, the same having its marginal edges bent reversely to form flanged margins, said margins being overlapped and located on one face only of the gasket, the opposite face of the gasket being upon a curve, there being an intervening hollow chamber of material dimensions between the flanged and curved portions of the gasket.

10. A gasket formed of a sheet bent into substantially cylindrical cross section with the marginal walls reversely bent to provide reinforcing edges overlapping and contacting with each other.

11. A gasket formed of a sheet bent into substantially cylindrical cross section with the marginal walls reversely bent to provide reinforcing edges, said edges overlapping and contacting with each other and being inclined to the horizontal plane of the gasket.

In testimony whereof I affix my signature at 10 South La Salle Street, Chicago, Ill.

FRANK J. OVEN.